US010565131B2

(12) United States Patent
Chung et al.

(10) Patent No.: US 10,565,131 B2
(45) Date of Patent: Feb. 18, 2020

(54) MAIN MEMORY INCLUDING HARDWARE ACCELERATOR AND METHOD OF OPERATING THE SAME

(71) Applicant: INDUSTRY-ACADEMIC COOPERATION FOUNDATION, YONSEI UNIVERSITY, Seoul (KR)

(72) Inventors: Eui Young Chung, Seoul (KR); Hyeok Jun Seo, Seoul (KR); Sang Woo Han, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 163 days.

(21) Appl. No.: 15/461,852

(22) Filed: Mar. 17, 2017

(65) Prior Publication Data
US 2017/0270056 A1 Sep. 21, 2017

(30) Foreign Application Priority Data

Mar. 18, 2016 (KR) ........................ 10-2016-0033035

(51) Int. Cl.
*G06F 12/14* (2006.01)
*G06F 12/1027* (2016.01)
*G06F 12/1009* (2016.01)
*G06F 12/0868* (2016.01)

(52) U.S. Cl.
CPC ........ *G06F 12/145* (2013.01); *G06F 12/1009* (2013.01); *G06F 2212/1016* (2013.01); *G06F 2212/1044* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 8,327,059 B2 * | 12/2012 | Chen .................. | G06F 12/145 711/150 |
| 9,223,663 B2 * | 12/2015 | Hom .................. | G06F 11/20 |
| 9,244,860 B2 * | 1/2016 | Gaertner ............. | G06F 12/0284 |
| 9,251,090 B1 * | 2/2016 | Borthakur ........... | G06F 12/1009 |
| 9,274,974 B1 * | 3/2016 | Chen .................. | G06F 12/109 |

(Continued)

FOREIGN PATENT DOCUMENTS

| | | |
|---|---|---|
| KR | 10-2001-0006855 A | 1/2001 |
| KR | 10-2009-0039761 A | 4/2009 |

(Continued)

OTHER PUBLICATIONS

Webopedia, "API", Jun. 21, 2000, pp. 1-2, https://web.archive.org/web/20000621114956/https://www.webopedia.com/TERM/A/API.html (Year: 2000).*

(Continued)

*Primary Examiner* — Christopher D Birkhimer
(74) *Attorney, Agent, or Firm* — Sughrue Mion, PLLC (57) ABSTRACT

Disclosed is a main memory capable of speeding up a hardware accelerator and saving memory space. The main memory according to the present disclosure is at least temporarily implemented by a computer and includes a memory, and an accelerator responsible for performing an operation for hardware acceleration while sharing the storage space of a host processor and the memory.

12 Claims, 7 Drawing Sheets

(56) References Cited

U.S. PATENT DOCUMENTS

2011/0078361 A1* 3/2011 Chen ................... G06F 12/145
711/6
2011/0161620 A1* 6/2011 Kaminski .......... G06F 12/1009
711/207

FOREIGN PATENT DOCUMENTS

KR    10-2013-0110459 A    10/2013
KR    10-2015-0100042 A     9/2015

OTHER PUBLICATIONS

Webopedia, "Graphics Accelerator", Apr. 11, 2001, pp. 1-3, https://web.archive.org/web/20010411030753/https://www.webopedia.com/TERM/G/graphics_accelerator.html (Year: 2001).*

Margaret Rouse, "Processing in Memory (PIM)", Jan. 2011, pp. 1-4, https://searchbusinessanalytics.techtarget.com/definition/processing-in-memory-PIM (Year: 2011).*

Communication dated Mar. 27, 2018, issued by the Korean Patent Office in counterpart Korean Application No. 10-2016-0033035.

Communication dated Aug. 30, 2017 from the Korean Intellectual Property Office in counterpart Patent Application No. 10-2016-0033035.

Yakun Sophia Shao et al., "Toward Cache-Friendly Hardware Accelerators," IEEE Micro Top Picks of 2014, May 7, 2015, pp. 1-6.

Korean Office Action issued in KR 10-2016-0033035 dated Feb. 19, 2017.

* cited by examiner

MAIN MEMORY INCLUDING HARDWARE ACCELERATOR AND METHOD OF OPERATING THE SAME

CROSS-REFERENCE TO RELATED APPLICATION

This application claims the priority benefit of Korean Patent Application No. 10-2016-0033035, filed on Mar. 18, 2016 in the Korean Intellectual Property Office, the disclosure of which is incorporated herein by reference.

BACKGROUND OF THE DISCLOSURE

Field of the Disclosure

The present disclosure relates to a main memory capable of speeding up a hardware accelerator and saving memory space.

Description of the Related Art

In computing, hardware acceleration refers to use of hardware capable of performing some functionality faster than software running on a central processing unit (CPU). Examples of hardware acceleration include blitting acceleration functionality in a graphics processing unit (GPU) and functions for complex functionality in a CPU. In general, processors are executed continuously and functions are executed one by one. Various technologies are used to improve performance and hardware acceleration is one such technology.

A hardware accelerator performs hardware acceleration, and typically includes an Computing unit and a memory space that are separate from each other. When an accelerator is activated, data to be used in the accelerator is transferred from a main memory to a memory inside the accelerator by direct memory access (DMA). In addition, when operation of the accelerator is completed, obtained data is transferred from the memory inside the accelerator to the main memory by DMA. In this case, when the amount of data to be transferred is large, overhead for data transfer becomes too large, which may be inefficient in terms of speed.

In addition, an operating system allocates an independent virtual memory space for each process. This allows the memory space to be used as if it were a contiguous space, even if physical addresses are not contiguous. When a processor requests a virtual address, a translation look-ahead buffer (TLB) translates the address into a physical address and memory access is performed. In this case, an accelerator should be activated using the physical address because the accelerator cannot access the TLB.

RELATED DOCUMENTS

Patent Documents

Korean Patent Application Publication No. 10-2001-0006855
Korean Patent Application Publication No. 10-2009-0039761

SUMMARY OF THE DISCLOSURE

Therefore, the present disclosure has been made in view of the above problems, and it is an object of the present disclosure to provide a main memory capable of speeding up a hardware accelerator and saving memory space.

In accordance with the present disclosure, the above and other objects can be accomplished by the provision of a main memory, wherein the main memory is at least temporarily implemented by a computer and includes a memory, and an accelerator responsible for performing an operation for hardware acceleration while sharing the storage space of a host processor and the memory.

The accelerator according to one embodiment may include an operation unit responsible for securing the pointer address of a structure in which the virtual address space of a host process calling an accelerator API (Application Programming Interface) is defined, and a conversion manager responsible for securing a physical address using the virtual address based on the secured pointer address.

The conversion manager according to one embodiment may secure the physical address using a page table when the physical address corresponding to a virtual address requested using the pointer address is absent in a conversion buffer.

The operation unit according to one embodiment may perform an operation based on virtual memory when the API transfers a virtual address.

The operation unit according to one embodiment may directly access the physical memory by securing a physical address using the virtual address through the conversion manager each time the operation unit accesses the memory.

The conversion manager according to one embodiment may store a page table for accelerating conversion and perform a page table walk using the page table.

The memory according to one embodiment may store a page table for accelerating conversion and store a physical address secured through a page table walk in the conversion buffer of the conversion manager, and the conversion manager may access the data of the memory using the stored physical address.

In accordance with an aspect of the present disclosure, the above and other objects can be accomplished by the provision of a method of operating a main memory, wherein the method is at least temporarily implemented by a computer and includes a step of requesting data by transferring a virtual address from an accelerator included in a main memory to a conversion manager, a step of determining whether a physical address corresponding to the requested virtual address is present in a conversion buffer inside the conversion manager, and, based on the determined results, when the virtual address is present, a step of securing the requested physical address using the virtual address, a step of accessing data through the secured physical address, and a step of storing the secured physical address in the conversion buffer.

The method according to one embodiment may further include, based on the determined results, when a physical address is absent in the conversion buffer, a step of accessing a page table inside a conversion manager using a structure transferred from an accelerator API, a step of performing a page table walk based on the page table, and a step of securing a physical address using the virtual address through the performed page table walk.

In accordance with another aspect of the present disclosure, there is provided a method of operating a main memory, wherein the method is at least temporarily implemented by a computer and includes a step of requesting data by transferring a virtual address from an accelerator included in a main memory to a conversion manager, a step of determining whether a physical address corresponding to the requested virtual address is present in a conversion buffer inside the conversion manager, and, based on the determined results, when the virtual address is absent, a step of accessing the page table of a memory using a structure, a step of caching the page table, which is present inside the memory, in a conversion manager, a step of performing a page table walk using the cached page table, a step of securing a physical address using the virtual address through the performed page table walk, and a step of storing the obtained physical address in the conversion buffer and accessing data using the corresponding physical address.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Hereinafter, preferred embodiments of the present disclosure will be described in detail with reference to the accompanying drawings. However, the scope of the present disclosure is not limited by these embodiments. Like reference numerals in the drawings denote like elements.

Although terms used in the specification are selected from terms generally used in related technical fields, other terms may be used according to technical development and/or due to change, practices, priorities of technicians, etc. Therefore, it should not be understood that terms used below limit the technical spirit of the present disclosure, and it should be understood that the terms are exemplified to describe embodiments of the present disclosure.

Also, some of the terms used herein may be arbitrarily chosen by the present applicant. In this case, these terms are defined in detail below. Accordingly, the specific terms used herein should be understood based on the unique meanings thereof and the whole context of the present disclosure.

Figure 1:
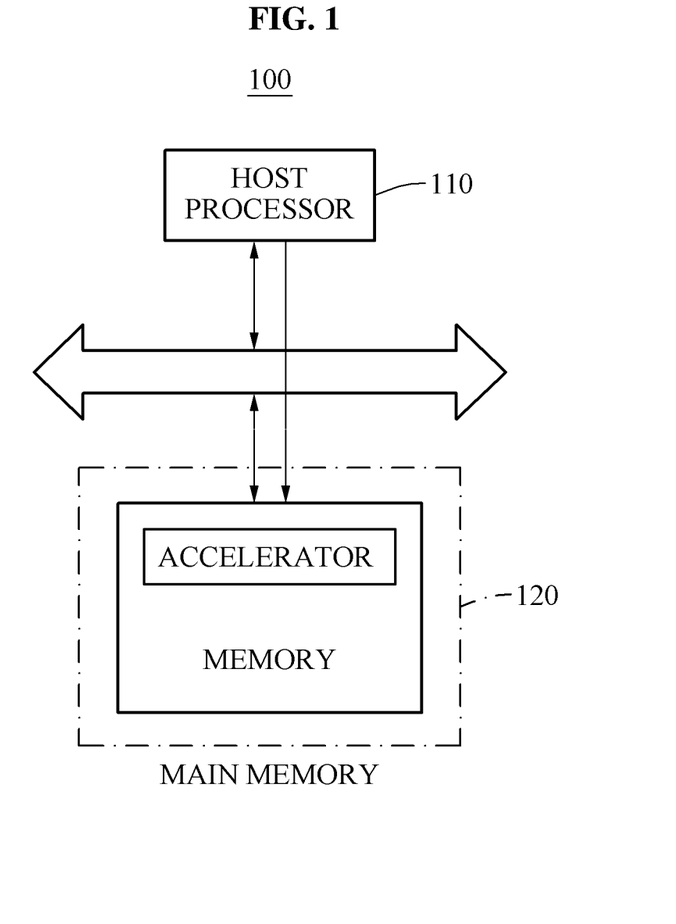
FIG. 1 is a diagram illustrating a whole system using a main memory according to one embodiment.

FIG. 1 is a diagram illustrating a whole system 100 using a main memory according to one embodiment.

In general, when a host processor calls an accelerator while performing an operation, a working set must be replicated in a dedicated memory space accessible by the accelerator. This process not only increases delay time required for the first call to the accelerator, but also causes the same data to be replicated in a main memory and the dedicated memory of the accelerator, thereby wasting memory resources.

However, the whole system 100 may use a main memory 120 to reduce waste of memory resources.

As illustrated in FIG. 1, the main memory 120 may include an operation device, i.e., an accelerator.

By placing an accelerator in the main memory 120, the accelerator may share the storage space of a host processor 110 and the memory when performing operation for hardware acceleration. This means that the host processor 110 and the accelerator fully share the main memory, eliminating the need to replicate a working set in the dedicated memory space of the accelerator. Therefore, delay time required to call the accelerator may be short, and waste of memory resources may be prevented.

Figure 2:
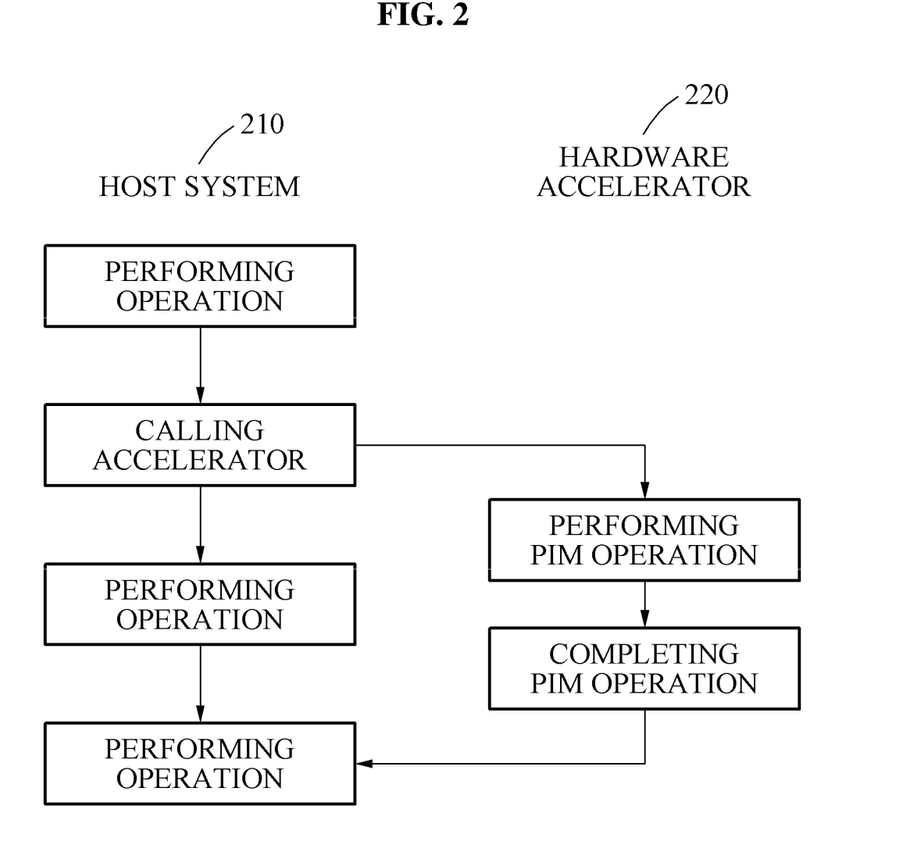
FIG. 2 is a diagram illustrating the characteristics of operation between a host system and a hardware accelerator.

FIG. 2 is a diagram illustrating the characteristics of operation between a host system and a hardware accelerator.

In a common system using an accelerator, a host system may activate an accelerator call API (Application Programming Interface) while performing an operation. In this case, the hardware accelerator performs related operation only when data is transferred from a main memory to an accelerator memory by direct memory access (DMA). In addition, DMA transfers data from the accelerator memory to the main memory to complete operation of the accelerator.

However, when a host processor calls an accelerator while performing an operation, a working set must be replicated in a dedicated memory space accessible by the accelerator. This process increases delay time required for the first call to the accelerator. In addition, the same data is replicated in a main memory and the dedicated memory of the accelerator, leading to waste of memory resources.

On the other hand, according to a main memory according to the present disclosure, when a call API is activated in a host system 210, a hardware accelerator 220 located in a main memory may implement the behavior of a conventional accelerator by simply performing and completing a PIM (Processing-In-Memory) operation. For reference, the PIM used in the present specification may be broadly interpreted to have various meanings, such as an accelerator, without limiting the scope of the present disclosure. As a result, since there is no need to replicate a working set in a dedicated memory space accessible by the accelerator, delay time required for the first call to the accelerator may be reduced. In addition, since the same data does not exist redundantly in the main memory and the dedicated memory of the accelerator, waste of memory resources may be prevented.

Figure 3:
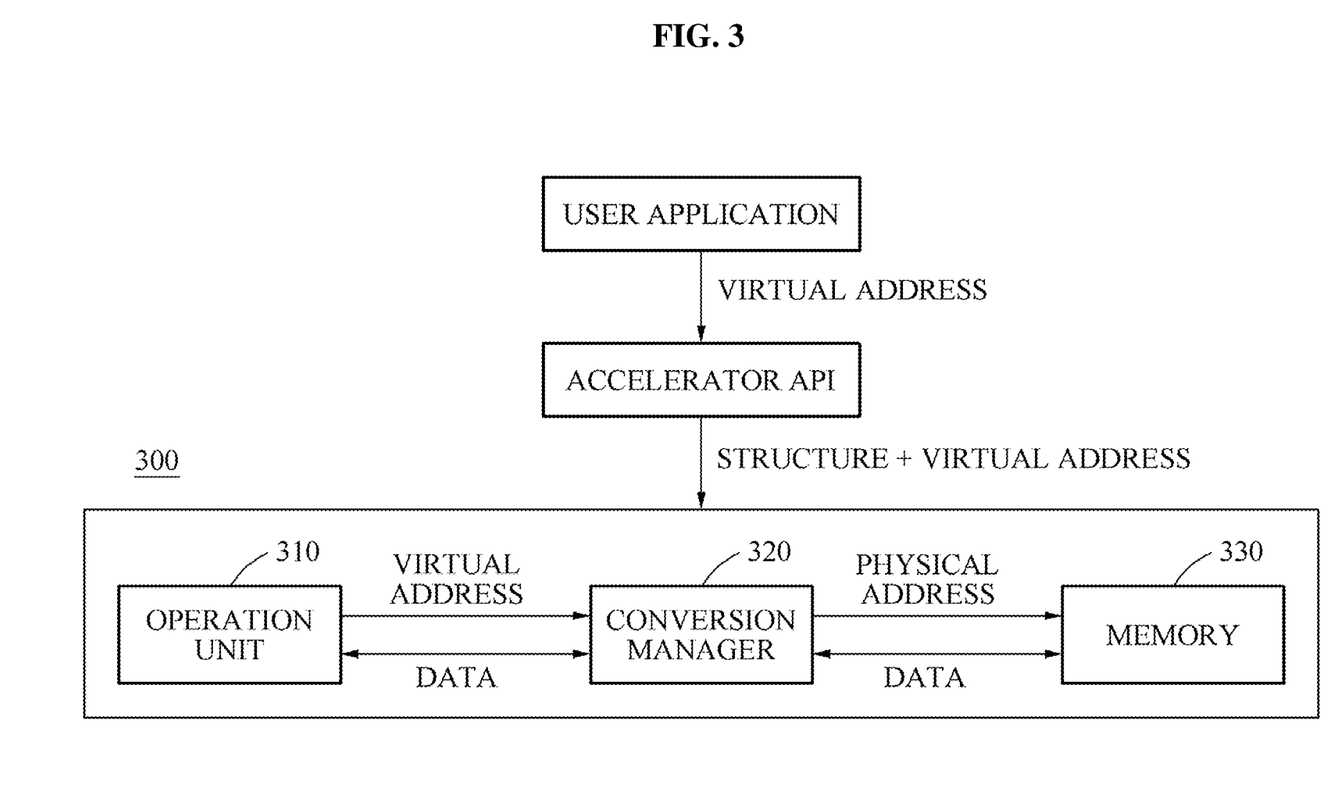
FIG. 3 is a diagram more specifically illustrating a main memory according to one embodiment.

FIG. 3 is a diagram more specifically illustrating a main memory 300 according to one embodiment.

An accelerator API (Application Programming Interface) that obtains a virtual address from a user application may transfer a structure and the virtual address to the main memory 300.

The main memory 300 may include an operation unit 310, a conversion manager 320 and a memory 330. The main memory 300 may be implemented at least temporarily by a computing terminal. The computing terminal includes any type of electronic device such as a personal computer, a medical device, a smart phone, a tablet computer and a wearable device. The operation unit 310, the conversion manager 320 and the memory 330 may be physical and/or logical elements included in such an electronic device, respectively. For example, the operation unit 310, the conversion manager 320 and the memory 330 may be implemented by a general-purpose operation resource, which is controlled by dedicated hardware or software or an operating system. In addition, the operation unit 310, the conversion manager 320 and the memory 330 may be implemented together on one chip, and thus may not be physically distinguished, and the implementation of such hardware resources may be changed as much as possible by the development of technology or design changes. Accordingly, it is understood that the functions, operations, and structures of the operation unit 310, the conversion manager 320 and the memory 330 are distinguished from each other, but there may be cases where such division is interpreted differently according to an embodiment.

First, the operation unit 310 may secure the pointer address of a structure in which the virtual address space of a host process calling the accelerator API is defined.

For reference, an operating system using a virtual memory system has a unique virtual address space per process. For example, in Linux, a virtual address space is defined in a structure (struct mm_struct*mm) called mm_struct. The mm_struct defines the virtual memory page space for the corresponding process, and has Page Global Directory (PGD) information. PGD is a top-level table required to secure a physical address using the virtual address. With PGD, conversion between the virtual address and the physical address may be performed through a page table walk.

Virtual addresses for memory consists of pointers to physical addresses. That is, a process of searching reference addresses in order is called a page table walk, and an address indicated by the final offset becomes the physical address of a page.

In addition, by adding a page offset to this address, a requested physical address may be secured.

The operation unit 310 may perform an operation based on virtual memory when the API (Application Programming Interface) transfers a virtual address.

In addition, each time the operation unit 310 accesses the memory, the operation unit 310 may directly access the physical memory by securing a physical address using the virtual address through the conversion manager 320.

The conversion manager 320 may secure a physical address using the virtual address based on a secured pointer address.

That is, the conversion manager 320 allows the operation unit to directly access corresponding data using the physical address of the data. In particular, Conventional host systems activated by virtual memory require a real physical address to operate an accelerator inside a memory, where the physical address may be secured through the conversion manager 320. That is, a virtual address that is transferred through a structure may be secured as a physical address. This allows the operation unit 310 to directly access the physical address of the memory 330.

The conversion manager 320 according to one embodiment may use a pointer address in a conversion buffer to distinguish between a case where there is a physical address corresponding to the pointer address corresponding to a requested virtual address and a case where there is no physical address. For example, a case where a physical address corresponding to a virtual address is present in a conversion buffer may be classified as 'hit', and a case where the physical address is not present may be classified as 'miss'.

The conversion manager 320 according to one embodiment directly secures a physical address from a virtual address when the physical address corresponding to the virtual address is present in a conversion buffer. On the other hand, the conversion manager 320 according to one embodiment may secure a physical address using a page table when the physical address corresponding to a virtual address is not present in a conversion buffer.

The page table may be present inside the conversion manager 320 or the memory 330. Embodiments of a case where the page table is present inside the conversion manager 320 are described with reference to FIGS. 4 and 6 below, and embodiments of a case where the page table is present inside the memory 330 are described in detail with reference to FIGS. 5 and 7 below.

The memory 330 stores and maintains data in a storage space identified by a physical address.

Figure 4:
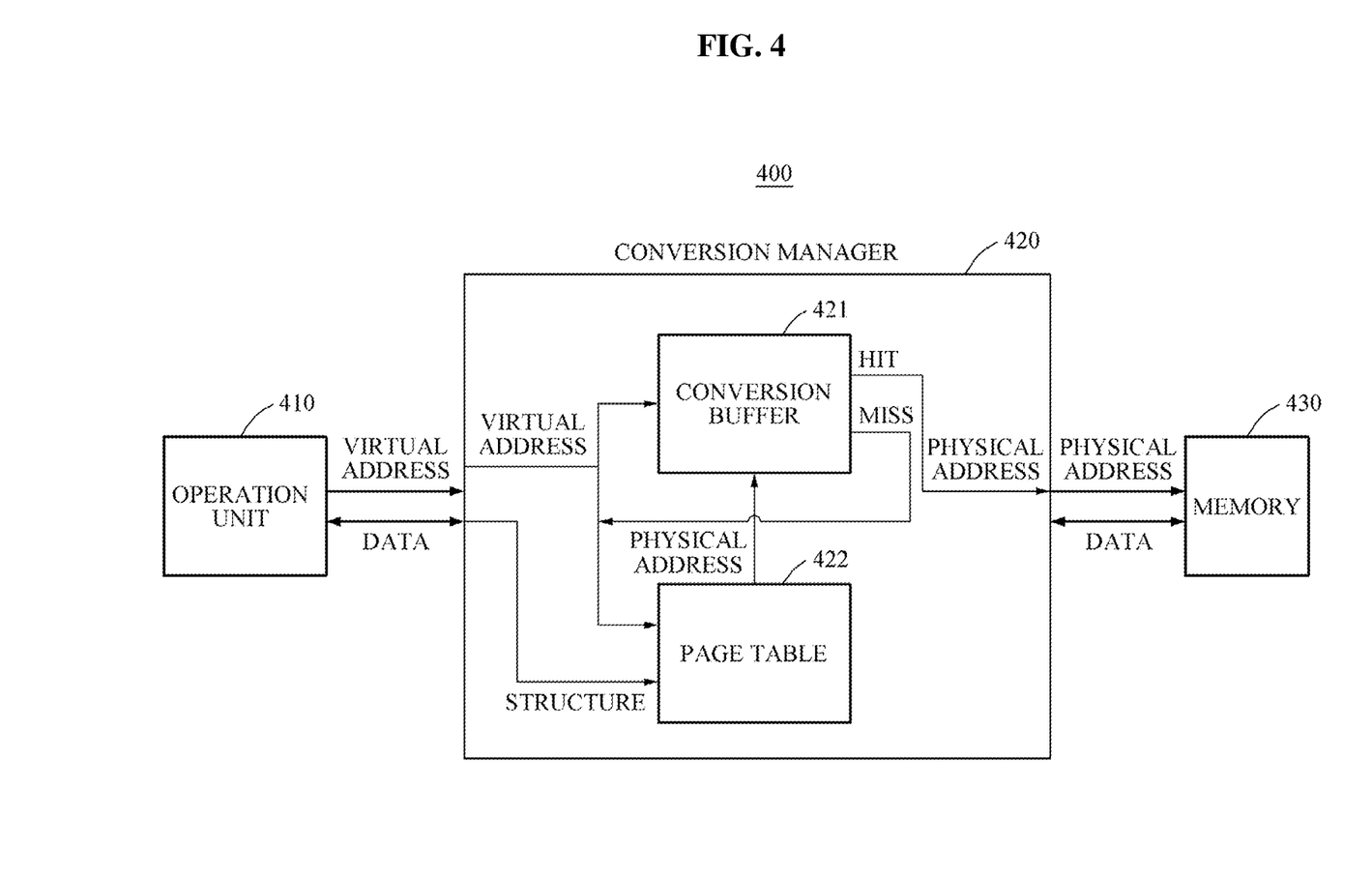
FIG. 4 is a diagram illustrating an embodiment in which a conversion manager stores a page table.

FIG. 4 is a diagram illustrating an embodiment in which a conversion manager stores a page table.

In particular, the conversion manager may store the page table for accelerating conversion, and may perform a page table walk using the page table.

More specifically, when a virtual address is transferred from an operation unit 410 of an accelerator included in a main memory to a conversion manager 420 and data is requested, it may be determined whether a physical address corresponding to the requested virtual address is present in a conversion buffer 421 inside the conversion manager 420. Based on the determined results, when the physical address is absent in the conversion buffer 421, the conversion manager 420 may access to a page table 422 inside the conversion manager 420 using a structure transferred from an accelerator API (Application Programming Interface). For example, the page table 422 may be interpreted as an internally cached page table or as a structure that is entirely imported into a conversion manager. In addition, based on the page table 422, the conversion manager 420 may perform a page table walk, and may secure a physical address using the virtual address through the performed page table walk.

Thereafter, the conversion manager 420 may obtain data stored in a memory 430 through the secured physical address and provide the data to the operation unit 410.

Figure 5:
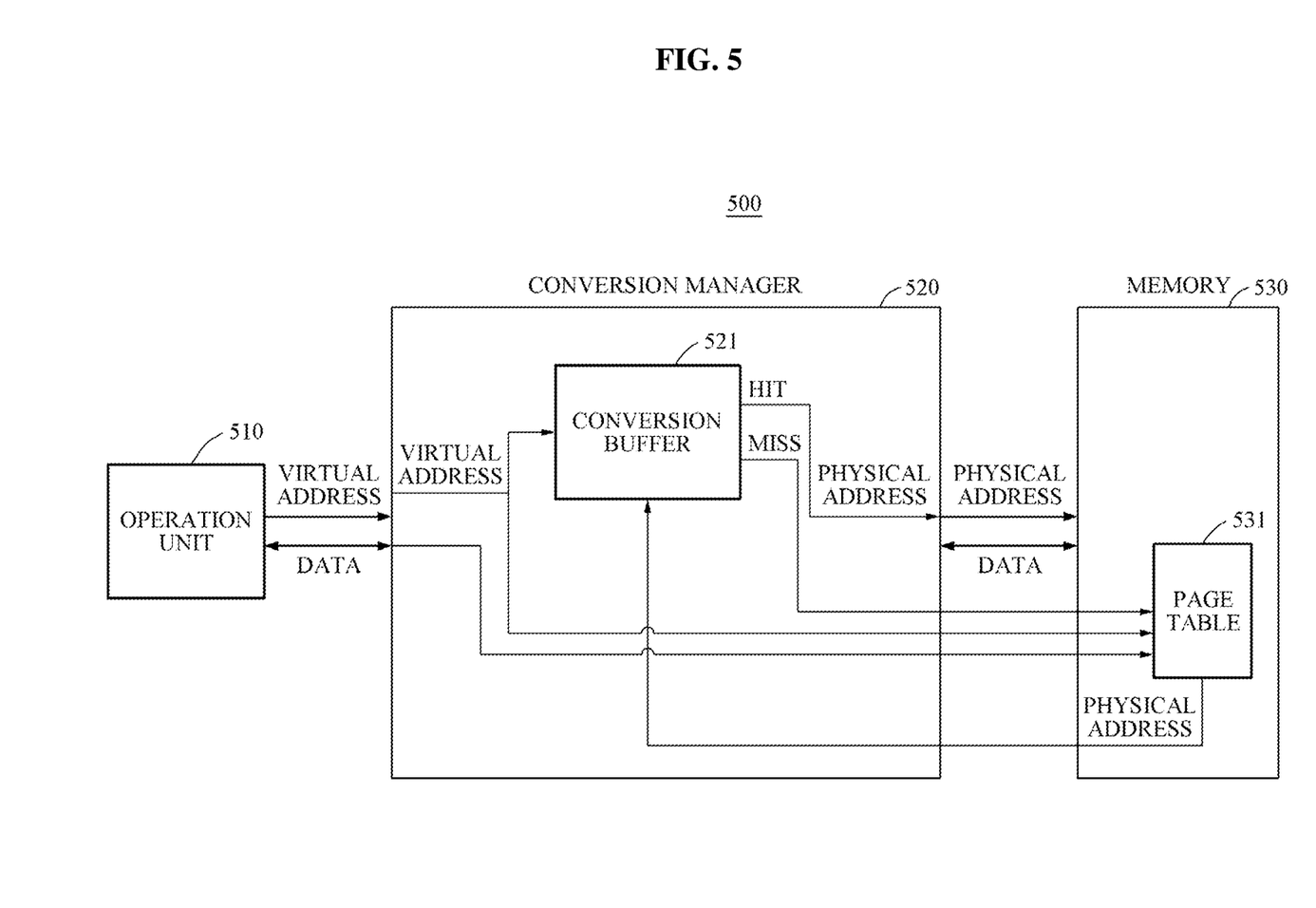
FIG. 5 is a diagram illustrating an embodiment in which a memory stores a page table.

FIG. 5 is a diagram illustrating an embodiment in which a memory stores a page table.

A memory 530 may store a page table 531 for accelerating conversion and store a physical address secured through a page table walk in a conversion buffer 521 of a conversion manager 520, and the conversion manager 520 may access the data of the memory 530 using the stored physical address.

Specifically, when a virtual address is transferred from an operation unit 510 of an accelerator included in a main memory to the conversion manager 520 and data is requested, it may be determined whether a physical address corresponding to the requested virtual address is present in the conversion buffer 521 inside the conversion manager 520.

Based on the determined results, when the physical address is absent, the page table of a memory is accessed using a structure, and the page table inside the memory is cached in the conversion manager 520. A page table walk is performed using the cached page table, and the virtual address is secured as a physical address through the performed page table walk.

In addition, the conversion manager 520 may store a secured physical address in the conversion buffer 521 of the conversion manager 520 and access data using the corresponding physical address.

Figure 6:
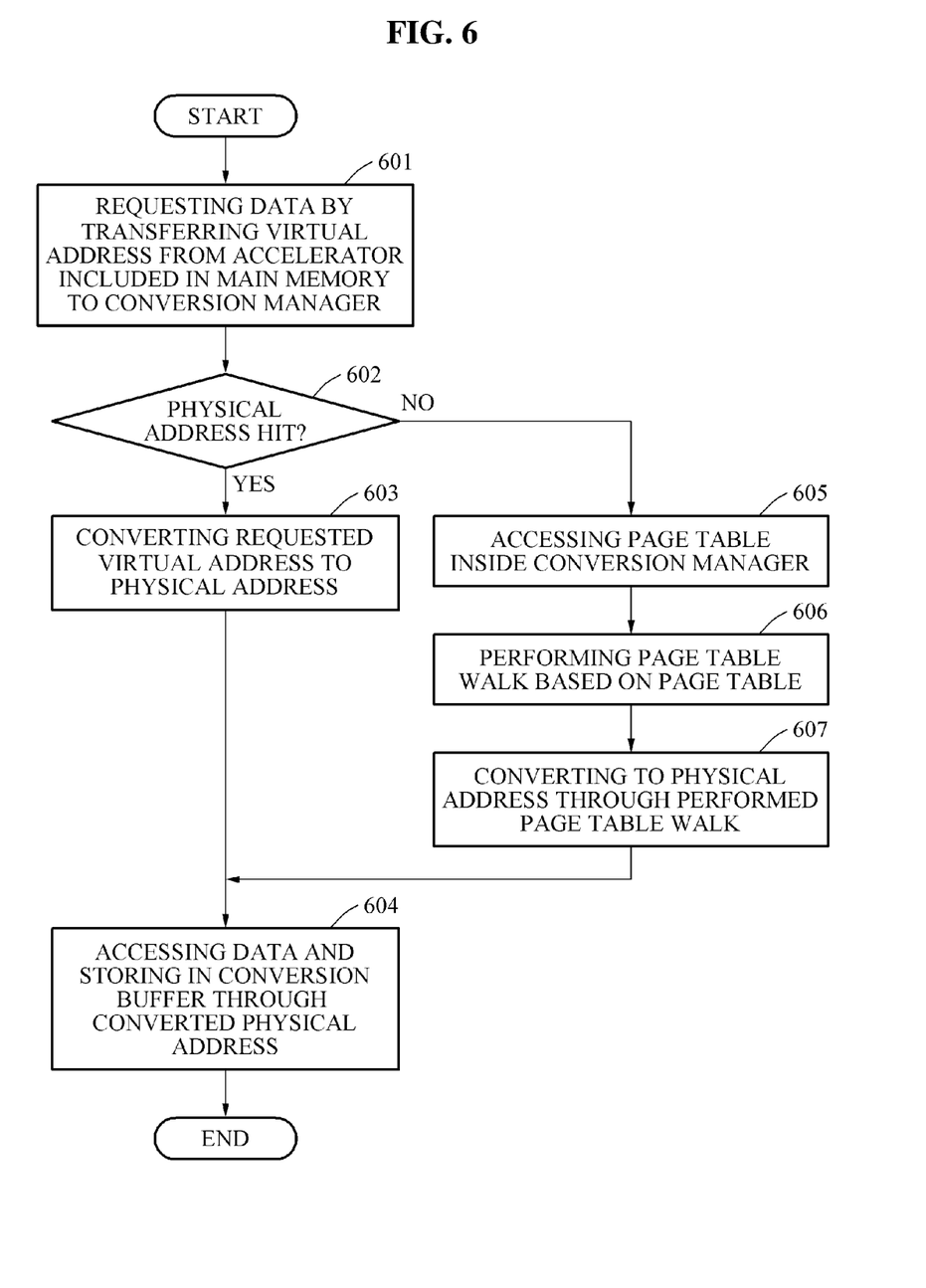
FIG. 6 is a diagram illustrating a method of operating a main memory when a conversion manager stores a page table.

FIG. 6 is a diagram illustrating a method of operating a main memory when a conversion manager stores a page table.

In a method of operating a main memory according to one embodiment, in order for an accelerator included in a main memory to operate, a virtual address may be transferred to a conversion manager and data may be requested. When a physical address corresponding to the virtual address is present in a conversion buffer inside the conversion manager (hit), the virtual address may be immediately secured as a physical address and the data may be accessed.

On the other hand, when a physical address is absent in a conversion buffer (miss), a page table inside a conversion manager is accessed using information of mm_struct received from an accelerator API.

In this case, after the page table is accessed, the physical address may be obtained through a page table walk. As a result, the obtained physical address may be stored in the conversion buffer and data may be accessed using the obtained physical address.

In particular, in a method of operating a main memory according to one embodiment, a virtual address is transferred from an accelerator included in a main memory to a conversion manager and data is requested (step 601). Then, it may be determined whether a physical address corresponding to the virtual address is present in a conversion manager, that is, whether there is a 'hit' (step 602).

Based on the results determined by step 602, when the physical address is already stored, the method of operating a main memory according to one embodiment may secure the requested virtual address as the physical address (step 603), and data may be accessed and obtained through the secured physical address and then stored (step 604).

However, based on the results determined by step 602, when the physical address is not already stored, in the method of operating a main memory according to one embodiment, a page table inside a conversion manager may be accessed (step 605). In the method of operating a main memory according to one embodiment, a page table walk may be performed based on the page table (step 606), and a virtual address may be secured as a physical address through the performed page table walk (step 607). Thereafter, in the method of operating a main memory according to one embodiment, data may be accessed and obtained through the secured physical address and stored in a memory (step 604).

Figure 7:
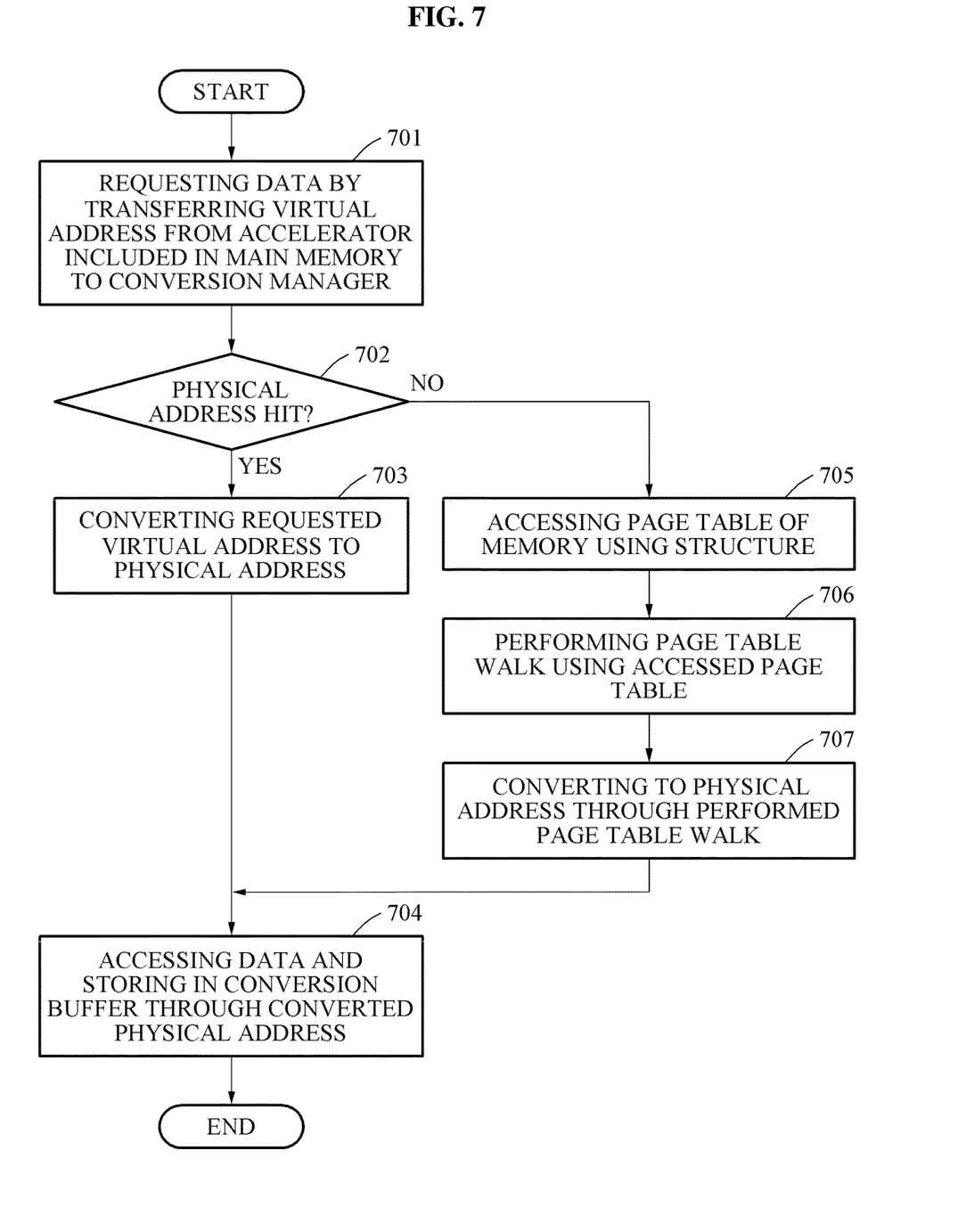
FIG. 7 is a diagram illustrating a method of operating a main memory when a memory stores a page table.

FIG. 7 is a diagram illustrating a method of operating a main memory when a memory stores a page table.

When a conversion manager fails to obtain a physical address corresponding to a virtual address, the conversion manager may access the page table of a main memory using a structure (e.g., mm_struct). In this case, the page table inside the main memory may be cached in a conversion manager, a physical address secured through a page table walk may be stored in a conversion buffer, and data may be accessed using the corresponding physical address. Specifically, in the method of operating a main memory according to one embodiment, a virtual address is transferred from an accelerator included in a main memory to a conversion manager and data is requested (step 701). Then, it may be determined whether a physical address corresponding to the virtual address is present in a conversion manager, that is, whether there is a 'hit' (step 702).

Based on the determined results, when the physical address is already stored, in the method of operating a main memory according to one embodiment, the requested virtual address may be secured as the physical address (step 703), and data may be accessed and obtained through the secured physical address and stored in a memory (step 704).

However, based on the results determined by step 702, when the physical address is not already stored, in the method of operating a main memory according to one embodiment, a page table inside a memory may be accessed using a structure (step 705). In the method of operating a main memory according to one embodiment, the page table inside the memory may be cached in a conversion manager (step 706), and a page table walk may be performed using the cached page table (step 707). In addition, in the method of operating a main memory according to one embodiment, a virtual address may be secured as a physical address through the page table walk performed according to one embodiment (step 708).

Thereafter, in the method of operating a main memory according to one embodiment, data may be accessed and obtained through the secured physical address and stored in a memory (step 704).

According to the present disclosure, an operation device associated with an accelerator can be included in a main memory. As a result, a host processor and the operation device fully share the main memory, eliminating the need to replicate a working set in the dedicated memory space of the accelerator. In addition, delay time required to call the accelerator can be short, and waste of memory resources can be prevented. In this structure, since an operation device is present inside a main memory, the corresponding data can be directly accessed using the physical address of data. In this case, in order for an accelerator to access data accessed by a host processor with a virtual address, the physical address of the data can be secured.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave. The software may be distributed over a networked computer system and stored or executed in a distributed manner. The software and data may be stored in one or more computer-readable recording media.

The methods according to the embodiments of the present disclosure may be implemented in the form of a program command that can be executed through various computer means and recorded in a computer-readable medium. The computer-readable medium can store program commands, data files, data structures or combinations thereof. The program commands recorded in the medium may be specially designed and configured for the present disclosure or be known to those skilled in the field of computer software. Examples of a computer-readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include machine language code created by a compiler and high-level language code executable by a computer using an interpreter and the like. The hardware devices described above may be configured to operate as one or more software modules to perform the operations of the embodiments, and vice versa.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

What is claimed is:

1. A main memory, wherein the main memory is at least temporarily implemented by a computer and comprises:
   a memory; and
   an accelerator for performing an operation for hardware acceleration while sharing storage space of the main memory with a host processor, the sharing of the storage space eliminating a need to replicate a working set in a dedicated memory space for the accelerator,
   wherein the accelerator comprises:
   an operation unit for securing a pointer address of a structure in which a virtual address space of a host process calling an accelerator API (Application Programming Interface) is defined; and
   a conversion manager for securing a physical address using a virtual address based on the secured pointer address,
   wherein the conversion manager stores at least a portion of a page table for accelerating conversion and performs a page table walk using the stored at least portion of the page table,
   wherein the accelerator API obtains the pointer address from a user application and transfers the structure and the pointer address to the main memory,
   wherein the conversion manager accesses a page table inside the conversion manager using the structure transferred from the accelerator API when the physical address is absent in a conversion buffer of the conversion manager,
   wherein the conversion manager uses the pointer address in the conversion buffer to distinguish between a case where there is the physical address corresponding to the pointer address corresponding to a requested virtual address and a case where there is no physical address, and
   wherein the accelerator located in the main memory implements a behavior of an accelerator by performing and completing a PIM (Processing-In-Memory) operation.

2. The main memory according to claim 1, wherein the conversion manager secures the physical address using the page table when the physical address corresponding to the virtual address requested using the pointer address is absent in the conversion buffer.

3. The main memory according to claim 1, wherein the operation unit performs an operation based on virtual memory when the API transfers a virtual address.

4. The main memory according to claim 1, wherein the operation unit directly accesses the memory by securing a physical address using the virtual address through the conversion manager each time the operation unit accesses the memory.

5. The main memory according to claim 1, wherein the conversion manager directly accesses the memory by securing a physical address using the virtual address each time the conversion manager accesses the memory.

6. The main memory according to claim 1, wherein the memory stores the physical address secured through the page table walk in the conversion buffer of the conversion manager, and
   the conversion manager accesses data of the memory using the stored physical address.

7. A method of operating a main memory, wherein the method is at least temporarily implemented by a computer and comprises:
   requesting data by transferring a virtual address from an accelerator comprised in a main memory to a conversion manager;
   determining whether a physical address corresponding to the virtual address is present in a conversion buffer inside the conversion manager; and
   securing the physical address using the virtual address when the physical address corresponding to the virtual address is present in the conversion buffer based on the determined results,
   wherein the method comprises:
   performing, by the accelerator, an operation for hardware acceleration while sharing storage space of the main memory with a host processor, the sharing of the storage space eliminating a need to replicate a working set in a dedicated memory space for the accelerator,
   securing, by the accelerator, a pointer address of a structure in which a virtual address space of a host process calling an accelerator API (Application Programming Interface) is defined, and securing, by the accelerator, a physical address using a virtual address based on the secured pointer address, and
   wherein at least a portion of a page table for accelerating conversion is stored by the conversion manager, and a page table walk is performed by the conversion manager using the stored at least portion of the page table,
   wherein the accelerator API obtains the pointer address from a user application and transfers the structure and the pointer address to the main memory,
   wherein the conversion manager accesses a page table inside the conversion manager using the structure transferred from the accelerator API when the physical address is absent in a conversion buffer of the conversion manager,
   wherein the conversion manager uses the pointer address in the conversion buffer to distinguish between a case where there is the physical address corresponding to the pointer address corresponding to a requested virtual address and a case where there is no physical address,
   wherein the accelerator located in the main memory implements a behavior of an accelerator by performing and completing a PIM (Processing-In-Memory) operation.

8. The method according to claim 7, wherein the method further comprises accessing data through the secured physical address.

9. The method according to claim 7, wherein the method further comprises: based on the determined results, when the physical address corresponding to the virtual address is absent in the conversion buffer,
- accessing the page table inside the conversion manager using the structure transferred from the accelerator API (Application Programming Interface);
- performing a page table walk based on the page table; and
- securing the physical address using the virtual address through the performed page table walk.

10. A method of operating a main memory, wherein the method is at least temporarily implemented by a computer and comprises:
- requesting data by transferring a virtual address from an accelerator comprised in a main memory to a conversion manager;
- determining whether a physical address corresponding to the virtual address is present in a conversion buffer inside the conversion manager; and,
- based on the determined results, when the physical address corresponding to the virtual address is absent in the conversion buffer,
- accessing a page table of a memory using a structure;
- performing a page table walk using the accessed page table; and
- securing the physical address using the virtual address through the performed page table walk, wherein the method comprises:
- performing, by the accelerator, an operation for hardware acceleration while sharing storage space of the main memory with a host processor, the sharing of the storage space eliminating a need to replicate a working set in a dedicated memory space for the accelerator,
- securing, by the accelerator, a pointer address of a structure in which a virtual address space of a host process calling an accelerator API (Application Programming Interface) is defined, and securing, by the accelerator, a physical address using the virtual address based on the secured pointer address, and wherein at least a portion of the page table for accelerating conversion is stored by the conversion manager, and the page table walk is performed by the conversion manager using the stored at least portion of the page table, wherein the accelerator API obtains the pointer address from a user application and transfers the structure and the pointer address to the main memory, and wherein the conversion manager accesses a page table inside the conversion manager using the structure transferred from an accelerator API when the physical address is absent in a conversion buffer of the conversion manager, wherein the conversion manager uses the pointer address in the conversion buffer to distinguish between a case where there is the physical address corresponding to the pointer address corresponding to a requested virtual address and a case where there is no physical address, and wherein the accelerator located in the main memory implements a behavior of an accelerator by performing and completing a PIM (Processing-In-Memory) operation.

11. The method according to claim 10, wherein the method further comprises caching the page table, which is present inside the memory, in the conversion manager, and wherein the page table walk is performed by the conversion manager using the cached page table.

12. The method according to claim 10, wherein the method further comprises storing the secured physical address in the conversion buffer and accessing data using the corresponding physical address.

* * * * *